July 20, 1937.　　　W. L. MORRISON　　　2,087,777
VENTILATING DEVICE FOR AUTOMOBILES
Filed July 27, 1933　　　4 Sheets-Sheet 2
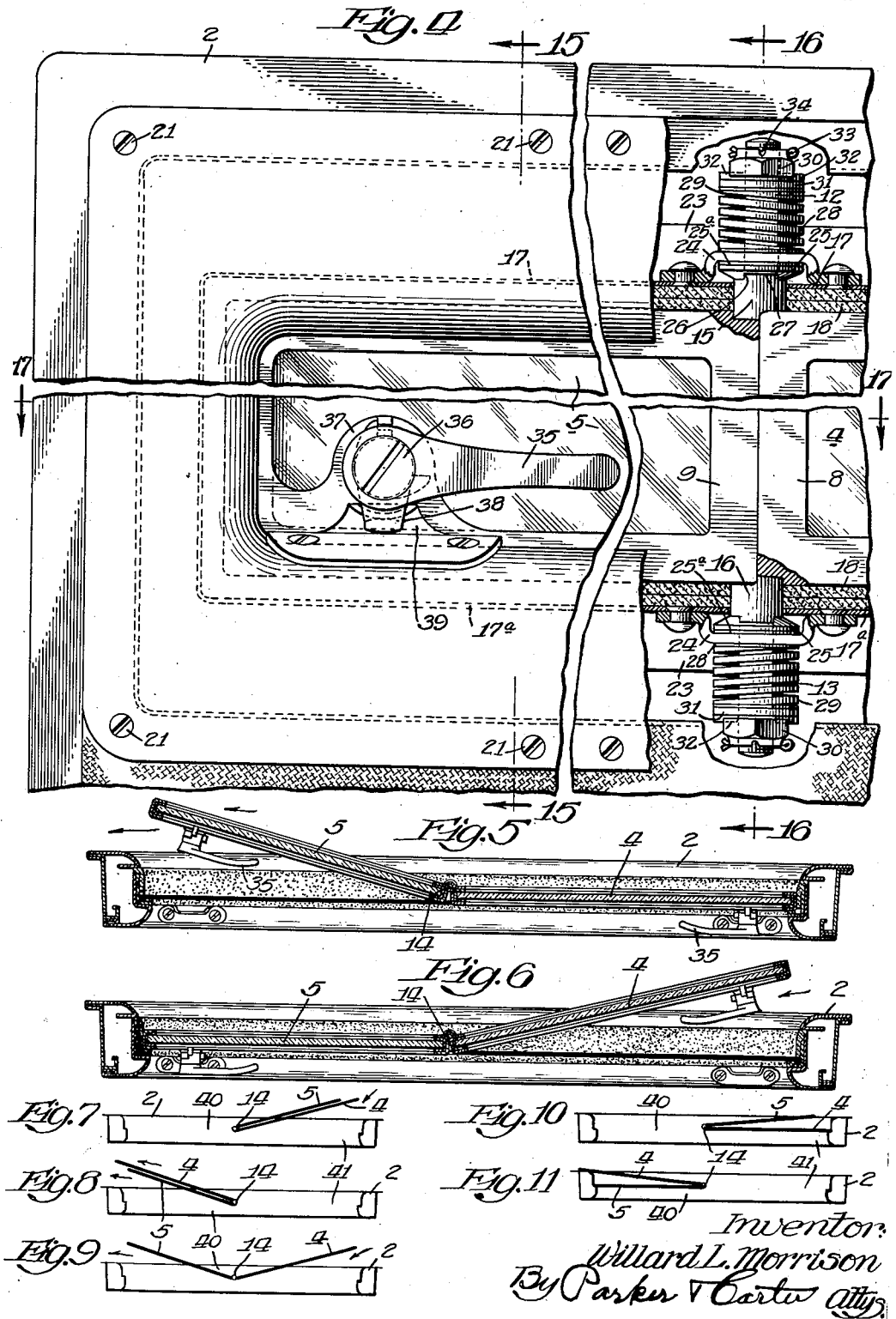

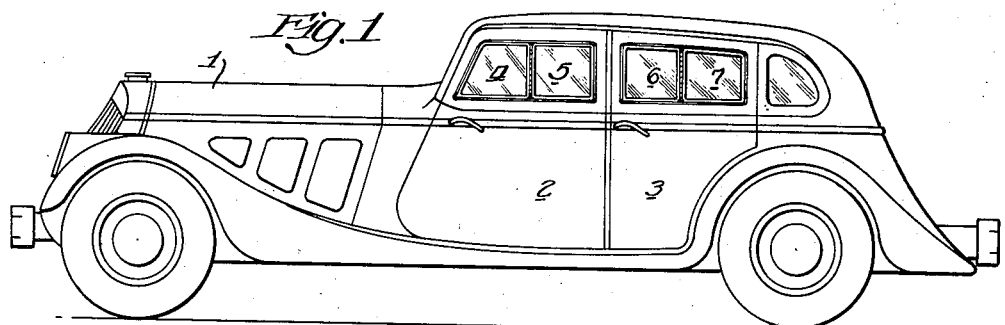
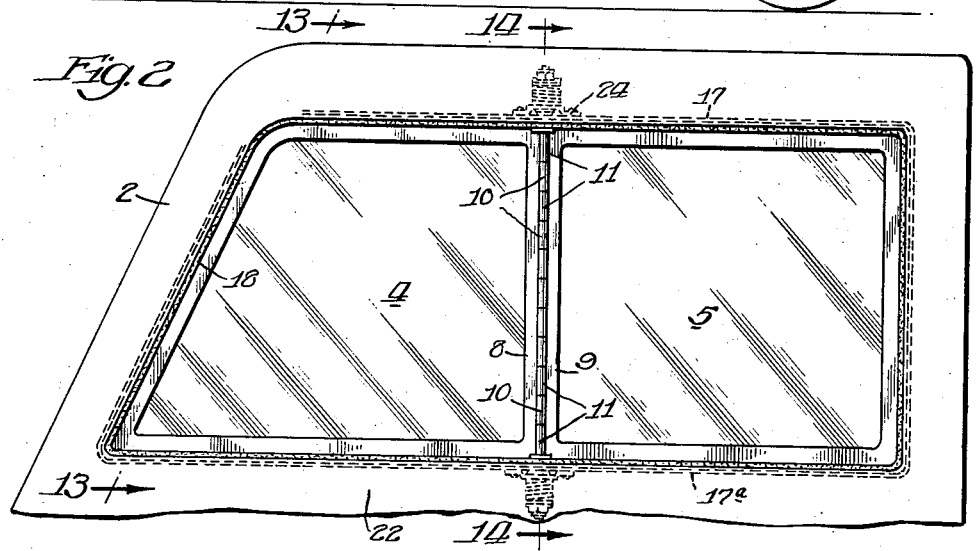
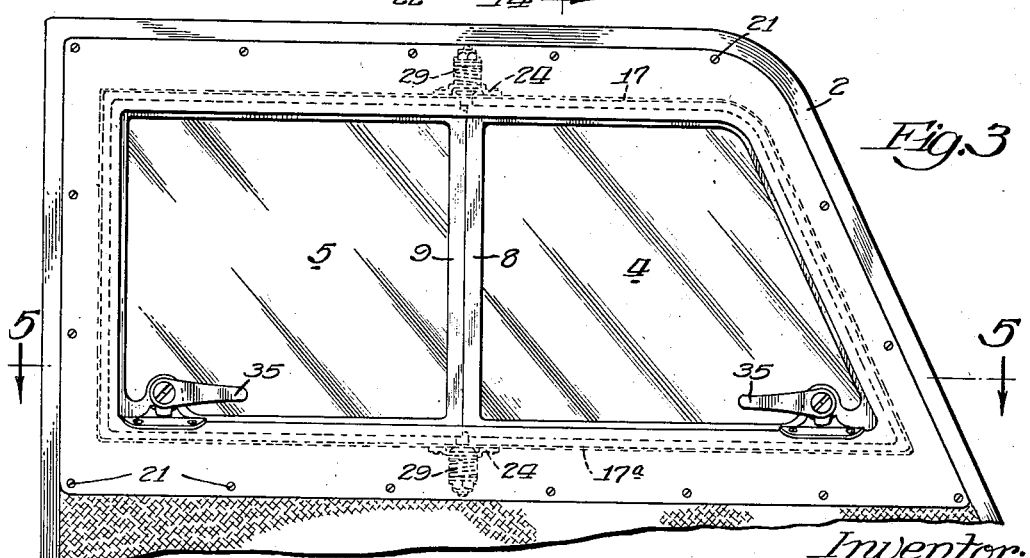

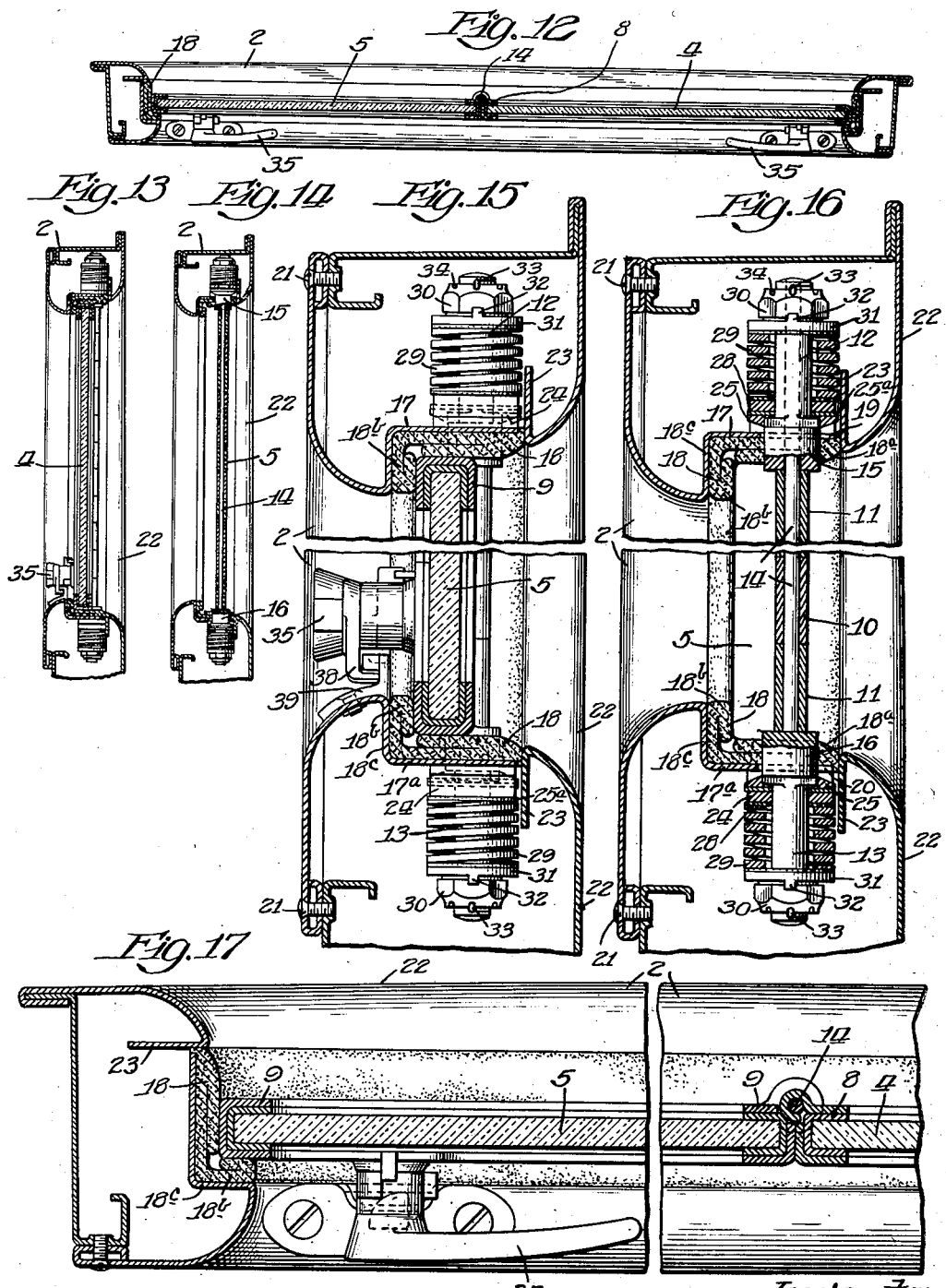

July 20, 1937.       W. L. MORRISON        2,087,777
VENTILATING DEVICE FOR AUTOMOBILES
Filed July 27, 1933     4 Sheets-Sheet 4
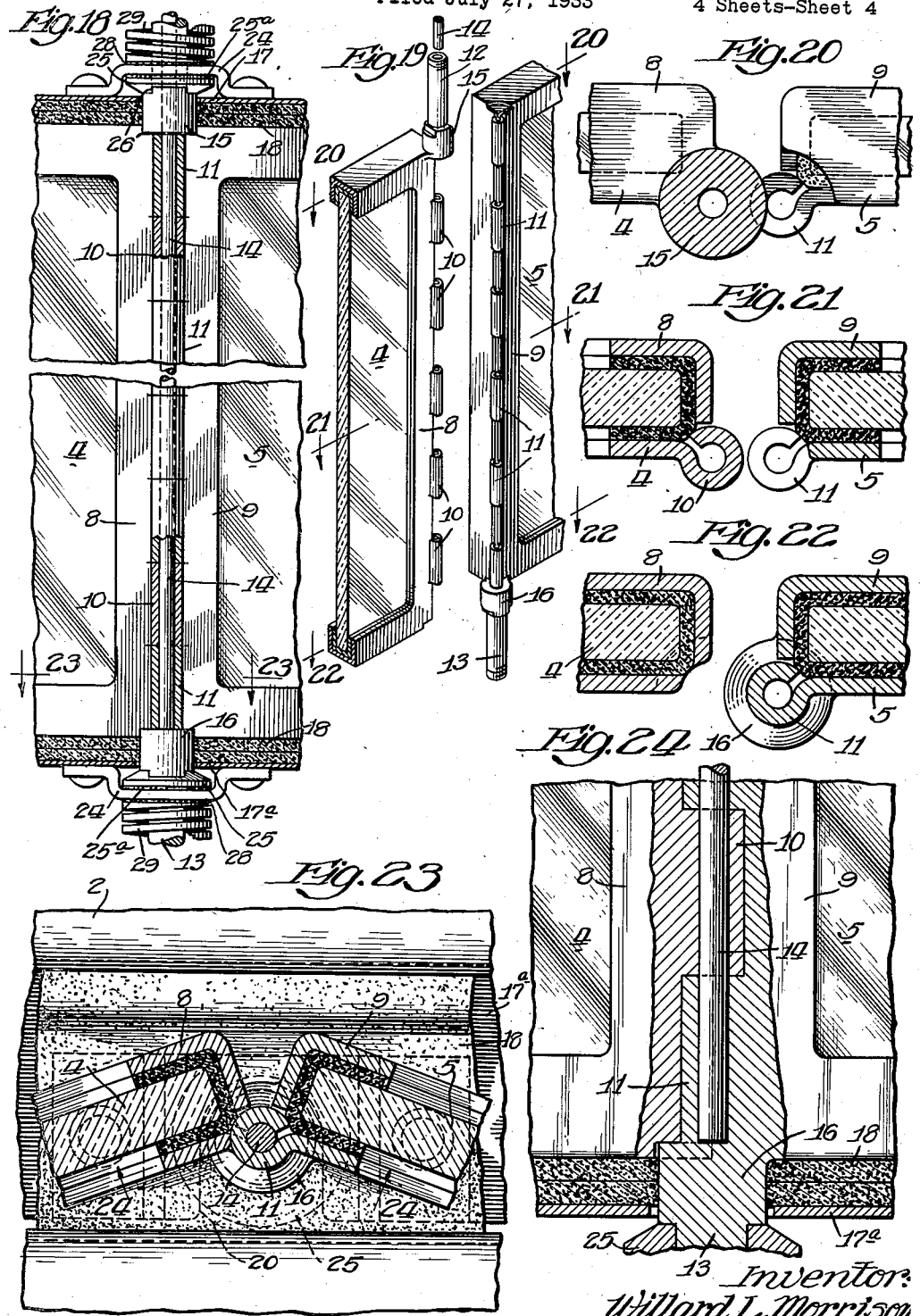
Inventor:
Willard L. Morrison
By Parker & Carter Attys Patented July 20, 1937

2,087,777

UNITED STATES PATENT OFFICE 2,087,777

VENTILATING DEVICE FOR AUTOMOBILES

Willard L. Morrison, Lake Forest, Ill.

Application July 27, 1933, Serial No. 682,390

7 Claims. (Cl. 296—44)

This invention relates to ventilating devices for automobiles and has for its object to provide a new and improved device of this description. The invention has as a further object to provide a ventilating device for automobiles by means of which the front or the rear portion of the window opening can be completely opened. The invention has other objects which are more particularly pointed out in the accompanying description.

Referring now to the drawings, Fig. 1 is a view showing an automobile provided with one form of ventilating device embodying the invention;

Fig. 2 is an enlarged outside view of the upper end of the front door of the automobile showing the ventilating device in position;

Fig. 3 is an inside view of the upper part of the front door shown in Fig. 2;

Fig. 4 is an enlarged view with parts omitted showing the friction pivots for the two sections of the ventilating device;

Fig. 5 is a sectional view taken on line 5—5 of Fig. 3 with the rear section of the ventilating device partly open;

Fig. 6 is a view similar to Fig. 5 with the front section of the ventilating device partly open;

Fig. 7 is a diagrammatic view showing the two sections of the ventilating device folded together and acting as an air scoop;

Fig. 8 is a diagrammatic view showing the two sections folded together acting as a deflector;

Fig. 9 is a diagrammatic view showing one section acting as a scoop and the other as a deflector;

Fig. 10 is a diagrammatic view showing one section of the window section closed and the other opened;

Fig. 11 is a diagrammatic view similar to Fig. 10 showing the opposite sections of the window opening opened and closed;

Fig. 12 is a view similar to Fig. 5 showing both window sections closed;

Fig. 13 is a sectional view taken on line 13—13 of Fig. 2;

Fig. 14 is a sectional view taken on line 14—14 of Fig. 2;

Fig. 15 is a sectional view taken on line 15—15 of Fig. 4;

Fig. 16 is a sectional view taken on line 16—16 of Fig. 4;

Fig. 17 is a sectional view taken on line 17—17 of Fig. 4;

Fig. 18 is an enlarged view showing the hinged ends of the two window sections;

Fig. 19 is a perspective view showing the hinged ends of the two window sections in the process of being assembled;

Fig. 20 is a sectional view taken on line 20—20 of Fig. 19;

Fig. 21 is a sectional view taken on line 21—21 of Fig. 19;

Fig. 22 is a sectional view taken on line 22—22 of Fig. 19;

Fig. 23 is a sectional view taken on line 23—23 of Fig. 18;

Fig. 24 is an enlarged view showing the lower portion of the pivoted ends of the pivoted sections.

Like numerals refer to like parts throughout the several figures.

Referring now to the drawings, I have shown in Fig. 1 an automobile 1 having the front and rear doors 2 and 3. The front door is provided with the two window sections 4 and 5 and the rear door with the two window sections 6 and 7. The window sections 4 and 5 are pivoted at their adjacent edges, these adjacent edges being preferably pivoted together. The window sections 6 and 7 are similarly pivoted together at their adjacent edges and are similar in all respects to the sections 4 and 5, except that the front edge of section 4 is inclined.

The adjacent edges of the window sections may be pivoted together in any suitable manner. As herein shown the window section 4 is provided with the frame member 8 and the window section 5 with the frame member 9. The frame member 8 has the separated hinge portions 10, and the frame member 9 has the separated hinged portions 11. These hinged portions have holes through them and the parts 9 and 10 are staggered with relation to each other. The window section 4 is provided with the pivot member 12 and the window section 5 with the pivot member 13. When the window sections are assembled the hinged members are brought into proximity, as shown for example in Figs. 19 to 22, and then the hinged members 10 are moved to a position intermediate the hinged members 11, and they are connected together by means of a rod 14 which is passed through them, as shown in Fig. 18, which acts as the pivot for pivoting the two sections together at their adjacent edges.

The window sections are placed in the window opening and the pivot members 12 and 13 pass through openings in the reveal. The pivot member 12 has an enlargement 15 near the frame member 8, and the pivot member 13 has an enlargement 16 near the frame member 9, see Fig. 19. The enlargement 15 is located in an opening in the reveal member 17 and the sealing member 18. The enlargement 16 is located in an opening in the reveal member 17a and the sealing member 18, as clearly shown in Fig. 18. The reveal members 17 and 17a are preferably integral, extending entirely around the window opening, and they have attached to them the sealing member 18. The reveal member 17 at the top of the window opening is preferably provided with a slot 19, see Fig. 16, which runs to the edge thereof so that the enlargement 15 may slip into it. The lower part 17a of the reveal is provided with a similar slot 20 for the enlargement 16. The sealing member 18 may have similar slots, but after the pivots are in position I prefer to insert in these slots the sections 18a, see Fig. 16, so that the sealing member will show from the outside of the car as continuous. The sealing member has the angular member 18b which engages a wall 18c of the reveal, see Figs. 15 and 16, against which the window sections are moved when in their closed position.

The reveal member is preferably separate from the car and the window sections are preferably connected therewith by inserting the enlargements 15 and 16 in the slots 19 and 20, as shown in Figs. 15 and 16. The reveal member and the entire assembly may then be moved into position with the window sections in the window opening, and then the reveal section is fastened in position in any suitable manner, as by the fastening devices 21. These fastening devices are on the inside of the car. The member 22 on the outside of the car around the window opening is provided with the angularly bent piece 23 which limits the movement of the window sections outwardly, as clearly shown in Figs. 15 and 16.

Some suitable means is provided for resisting the pivotal movement of the window sections. As herein shown this is accomplished by means of a friction device associated with each pivot. The pivot 12, for example, passes through a hole in a bracket 24, see Figs. 15, 16 and 18, which is attached to the window reveal 17. Below this bracket is a washer 25 which has a part 26 which engages a non-circular part 27 of the pivot so that it turns with the pivot. Between the washer 25 and the bracket is a friction washer 25a. A friction washer 28 is on the other side of the bracket 12 and a spring 29 engages it, the spring surrounding the pivot and being compressed by a nut 30 on the threaded end of the pivot 12, this compression causing the friction washers 25a and 28 to tightly engage the bracket 24. These friction washers may be of any suitable non-metallic material so as to increase the frictional effect. Between the spring and the nut is located a washer 31 provided on opposite sides with the lugs 32 which are opposed to the flat faces of the nut so that the washer turns with the nut. A cotter pin 33 passes through the pivot and into notches 34 in the nut. The bottom pivot 13 is arranged in a similar manner and I have applied the same reference letters to the similar parts. It will be noted that while the pivots 12 and 13 are in alignment, they are entirely separate, the pivot 12 being associated with the window section 4 and the pivot 13 with the window section 5, so that the friction device of pivot 12 holds the window section 4 in any desired position and the friction device of the pivot 13 holds the window section 5 in any desired position.

The window sections on the inside are provided with handles 35 by means of which they may be controlled. These handles also control the locking devices. The handles are connected with a shaft 36 mounted in a bracket 37 on the window section and this shaft has a latch 38 which engages a locking member 39 on the reveal. It will be seen that by means of this construction either of the window sections 4 and 5 may be moved outwardly while the other is closed, and one window section may be moved around to overlap the other so as to leave entirely open one of the portions of the window opening controlled thereby. In Figure 5, for example, I have shown the rear window section partially open to act as a deflector to deflect the current of air and cause air from the automobile to be drawn out for ventilating purposes. In Fig. 5 I have shown the front section 4 moved outwardly to act as a scoop to scoop air into the automobile. In Figures 7 to 11 I have shown diagrammatically some various positions of the window sections. In Fig. 7 the two sections are brought together and moved to the air scooping position, leaving the space 40 completely open. In Fig. 10 I have shown them brought together in overlapping position with the front section 4 closed and the part 40 of the window entirely open. In Fig. 8 I have shown them brought together with the rear section in air deflecting position and the front portion 41 of the window entirely open. In Fig. 9 I have shown the front section 4 in the scooping position and the rear section 5 in its air deflecting position. In Fig. 11 I have shown the two sections overlapping with the rear section 5 in its closed position and the portion 41 of the window entirely open. The two window sections may be brought to overlapping position, extending outwardly at right angles so as to completely open both window portions 40 and 41.

It is of course evident that the parts may be moved to other positions than those shown, these positions being shown for illustrative purposes. It will be seen that I have here the two window sections which are pivoted together by the pivot 14, and at the opposite ends of said pivots are two other pivots which pivotally connect the window sections in the window frame. In the ordinary construction the pivot 14 would be stationary and the hinged portions or sleeves 10 and 11 would move about it, as either one or both of the window sections 4 and 5 are moved.

This construction is adaptable to any of the ordinary forms of window frames or reveals, and in that event the window will be simply inserted in the window frame with the pivots properly mounted to give the desired result.

I claim:

1. A ventilating device for automobiles having a window opening surrounded by a rigid casing, a window in said window opening, comprising two window sections, a single pivot connected with the top of one section and a single pivot connected to the bottom of the other section, by means of which the sections are connected in the window opening said sections being pivotally connected at their adjacent edges so that they may be moved to different angular positions or to overlapping position.

2. A ventilating device for automobiles having a window opening surrounded by a rigid casing, a window in said window opening, comprising two window sections pivotally connected together at their adjacent edges and pivotally connected in position in the window opening, the pivots which pivot the two sections in the window opening being separate and having separate attachments to the sections and in substantial alignment and being independently operated.

3. A ventilating device for automobiles having a window opening, comprising two window sections pivotally connected together at their adjacent edges and pivotally connected in position in the window opening, the pivots which pivot the two sections in the window opening being in substantial alignment and being independently operated, said latter pivots having independent friction devices associated therewith.

4. A ventilating device for automobiles having a window opening surrounded by a rigid casing, a window in said window opening, comprising two window sections pivotally connected together at their adjacent edges and pivotally connected in position in the window opening, the pivots which pivot the two sections in the window opening being in substantial alignment and being independently operated, said latter pivots and the pivot which pivots the two sections together being all in substantial alignment.

5. A ventilating device for automobiles having a window opening surrounded by a rigid casing, a window in said opening comprising two window sections attached to said rigid casing, the window sections being pivotally connected at their adjacent edges, a friction pivot connected with each window section and extending through the rigid casing and fastening the window sections in position, said pivot members being in substantial alignment, and a cross connection between the said friction pivots.

6. A ventilating device for automobiles having a window opening surrounded by a rigid casing, a window in said opening comprising two window sections attached to said rigid casing, the window sections being pivotally connected at their adjacent edges, a friction pivot connected with each window section and extending through the rigid casing and fastening the window sections in position, said pivot members being in substantial alignment, and a cross connection between the said friction pivots, said cross connection pivotally connecting the two window sections together.

7. A ventilating device for automobiles comprising a door having a window opening therein surrounded by a rigid casing, two window sections in the window opening, a pivoting rod connecting the window sections together at their adjacent edges, a separate pivot at each end of said pivoting rod which pivotally connects the window sections in the window opening surrounding parts which surround said pivoting rod and said end pivots, the surrounding parts for the rod being connected with the window sections and the surrounding parts for the end pivots being connected with the rigid casing.

WILLARD L. MORRISON.